United States Patent [19]

Hoadley

[11] 4,050,793

[45] Sept. 27, 1977

[54] PORTABLE SLATING DEVICE

[76] Inventor: Howard W. Hoadley, 9413 Petit Ave., Sepulveda, Calif. 91343

[21] Appl. No.: 658,340

[22] Filed: Feb. 17, 1976

[51] Int. Cl.² ............................................. G03B 21/32
[52] U.S. Cl. ........................................ 352/5; 352/22; 352/23; 352/24; 352/90
[58] Field of Search ..................... 352/5, 22, 23, 24, 90

[56] References Cited

U.S. PATENT DOCUMENTS

| | | | |
|---|---|---|---|
| 1,885,555 | 11/1932 | Schwartz | 352/90 |
| 2,303,181 | 11/1942 | Thomas | 352/24 |
| 3,196,454 | 7/1965 | Fine | 352/24 |

Primary Examiner—Monroe H. Hayes

Attorney, Agent, or Firm—John T. Matlago

[57] ABSTRACT

A portable slating device comprises a light-tight housing having a lens on the front thereof and a copyholder on the rear thereof. When the lens on the front end of the housing is positioned adjacent the lens of a movie camera whose scene takes are to be identified by slating information, the housing lens functions as a supplementary close-up lens cooperating with the camera lens to sharply focus the information in the copyholder onto the film in the movie camera. When the filming of a scene-take starts, the operator closes a switch for simultaneously energizing a synchronizing light bulb located within the housing and an audio signal device mounted on the housing to provide for synchronizing the visual action of the film with the sound track.

8 Claims, 9 Drawing Figures

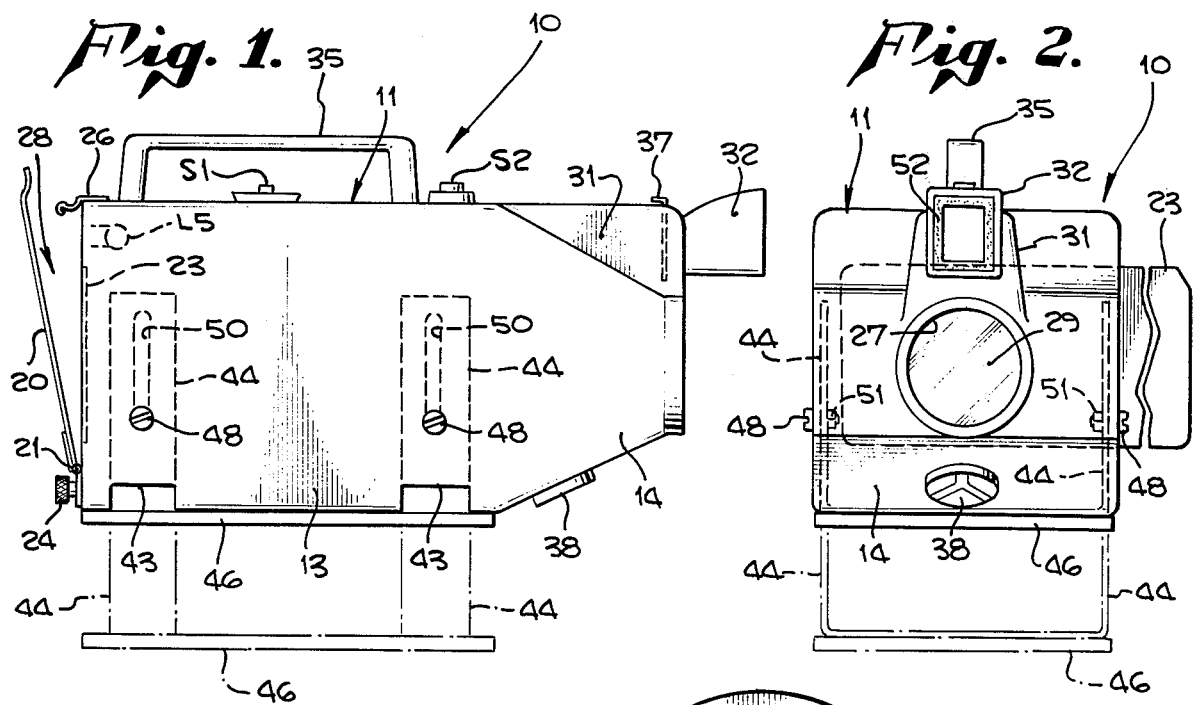
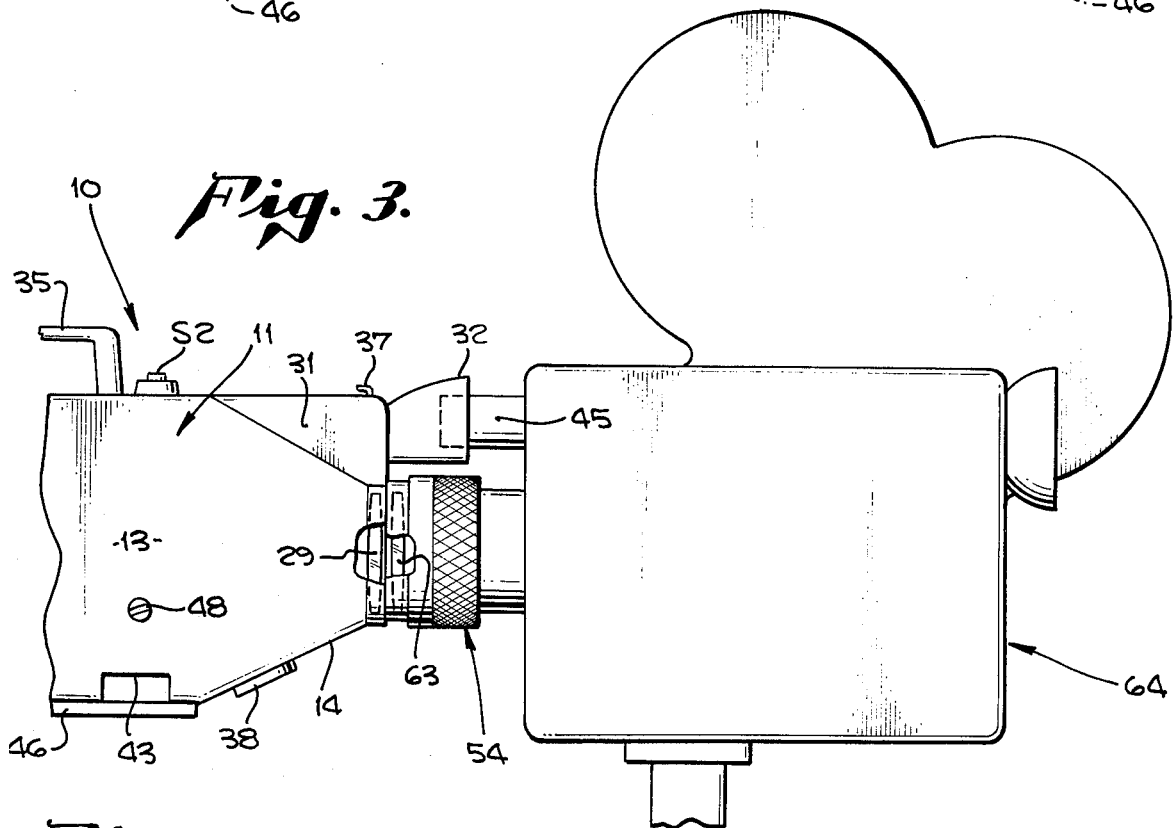
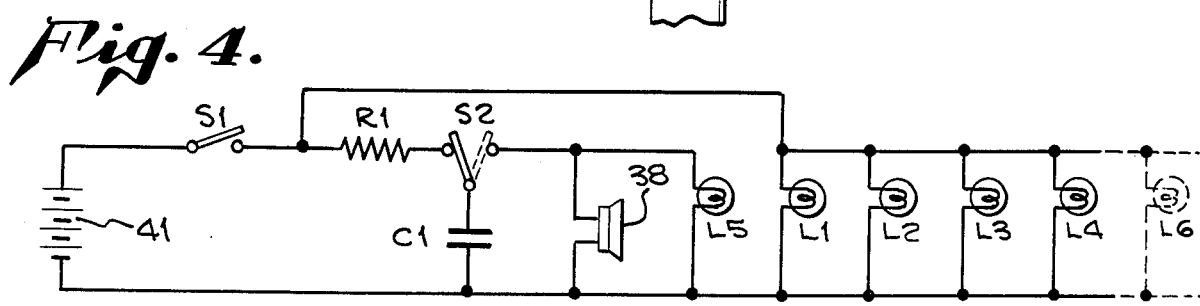

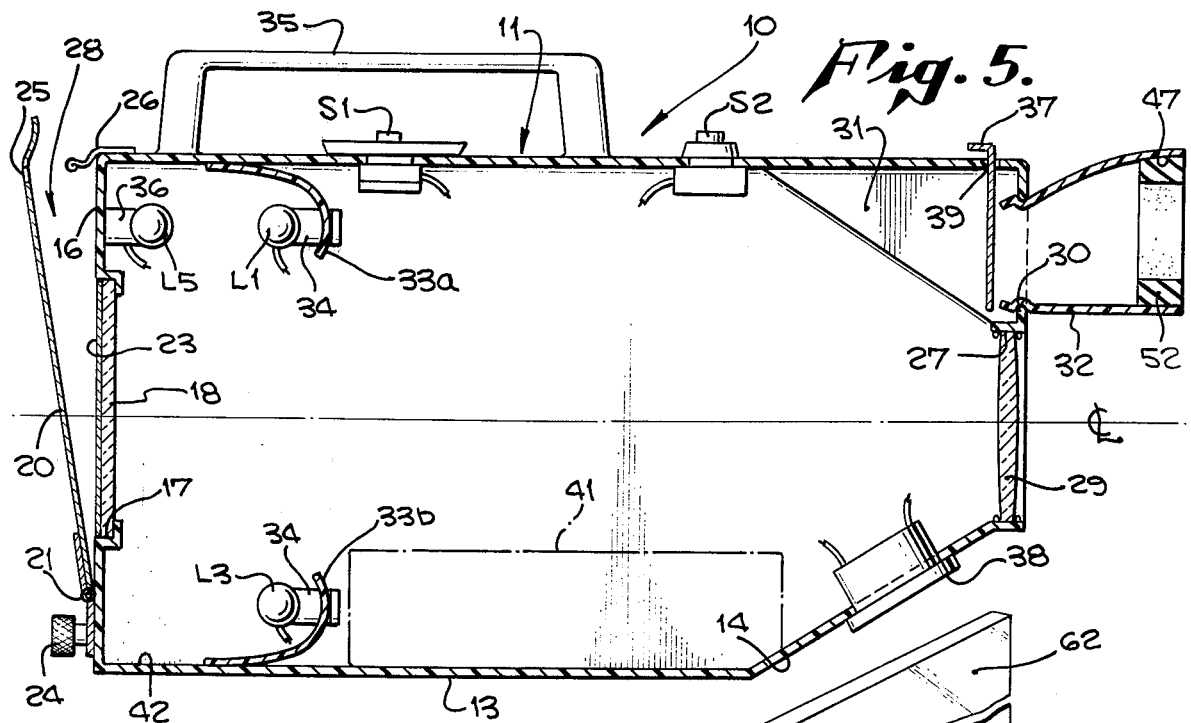
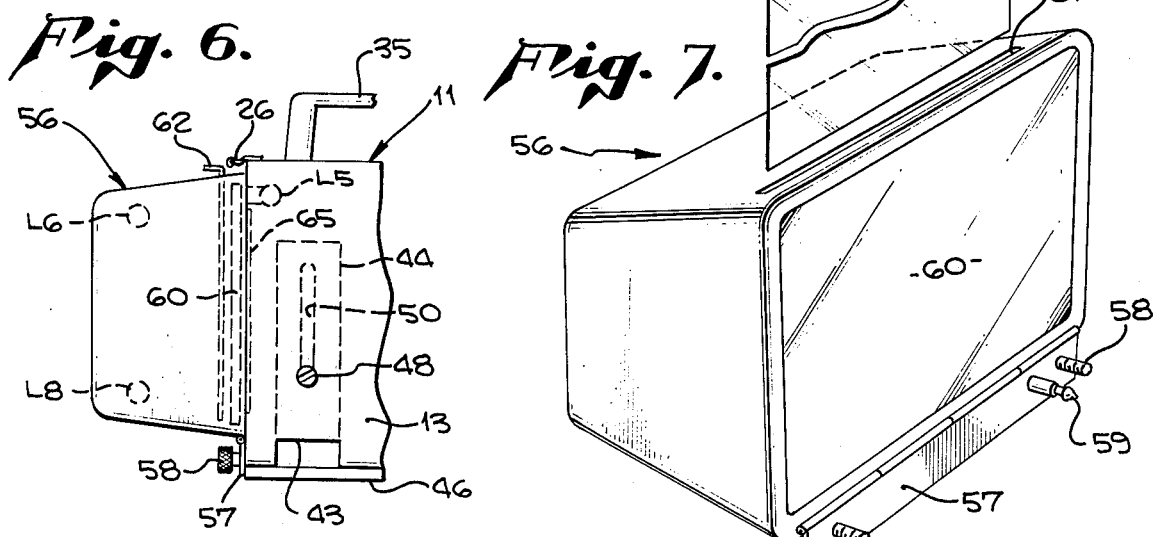
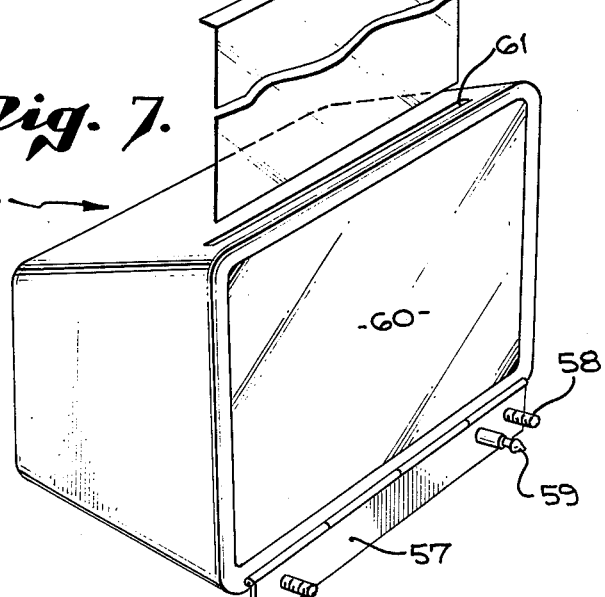
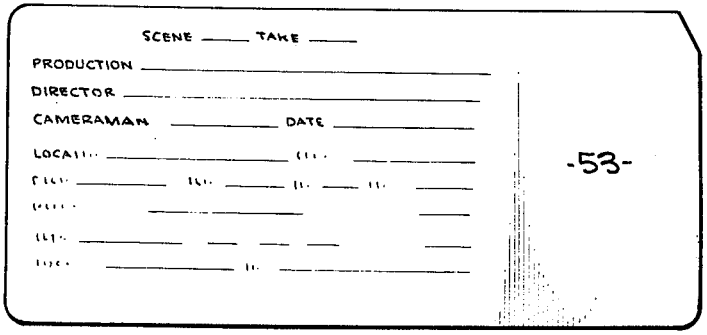
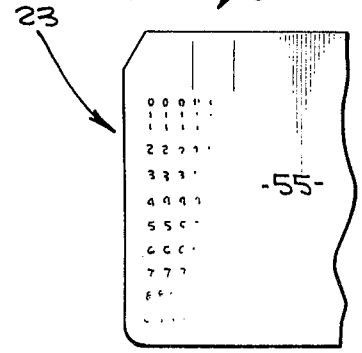

PORTABLE SLATING DEVICE

This invention relates to a portable slating device for motion picture production and more particularly to such a device which in addition to providing information for identifying a film-take provides cue indications for use in subsequently synchronizing the sound track of the motion picture to the visual action on the film.

In the production of motion pictures, each scene and each take must be identified on the first few frames of the subject take. The technique of photographing the identifying information on the film is called "slating" and takes its name from the slate board used in front of the camera. Usually the slate board contains fixed information related to the film production, such as the name and/or number of the production, the director, the cameraman, etc., and also changeable information such as scene and take numbers. In making sound films a "clapper board" is hinged to the top edge of the slate board. When slating begins the slate board is carried into the scene in front of the camera, the clapper board is raised, the camera and sound recorder are started, and when the sound speed is reached, the clapper board is dropped down so that its recorded slamming sound can be synchronized with the visual record of the clapper board meeting the slate board photographed on the film. After the film is processed, scenes and take are identifiable by the slate information, and the film editor can synchronize the sound track to visual action to achieve lip synchronization. The present invention is directed to a small size, portable, slating device which provides for efficiently utilizing information of a size as typed by a conventional typewriter, for example, for identifying a scene take. Furthermore, the slating device of the present invention is electrically operated to provide information for matching the sound track of a motion picture to its visual action.

Accordingly, one of the objects of the present invention is to provide a highly efficient, small size, portable, slating device which replaces the conventional slate board for identification of film and replaces the conventional manually operated clapper board for synchronizing the visual action with the sound track.

Another object of the present invention is to extend the use of a slating device enabling it to operate with a small size data processing card that has information printed thereon of a size as provided, for example, by a conventional typewriter.

Another object of the present invention is to provide a slating device wherein the card used for providing the slating information is of the type that can be processed by automatic equipment to provide for cost accounting functions, inventory control, and retrieval of the film takes.

Another object of the present invention is to provide a self contained, slating device which is electrically operated to simply produce visual and sound cue marks for synchronizing picture and sound tracks during the slating of a film take.

Another object of the present invention is to provide a slating device in the form of a small size housing having a lens on the front end thereof which acts as a supplementary lens in that it cooperates with the lens of a movie camera to sharply image information from a copyholder located on the back end of the housing onto the film of the camera.

With these and other objects in view, the invention consists of the construction, arrangement and combination of the various parts of the device, whereby the objects contemplated are obtained as herein set forth, pointed out in the appended claims and illustrated in the accompanying drawings.

In the drawings:

FIG. 1 is a side view of the slating device of the present invention;

FIG. 2 is a front end view of the slating device shown in FIG. 1;

FIG. 3 shows the slating device positioned for use adjacent the lens of a movie camera;

FIG. 4 is a schematic diagram of the electrical circuit provided for the slating device;

FIG. 5 is a sectional side view of the housing shown in FIG. 1;

FIG. 6 shows a rear illuminating end-box accessory forming a part of the copyholder attached on the back end of the housing;

FIG. 7 is a perspective view of the rear illuminating end-box;

FIG. 8 illustrates the back of a typical data processing card which contains slate information for placement in the copyholder of the slating device; and FIG. 9 shows the front of the data processing card shown in FIG. 8.

Referring to the drawings, the slating device 10 of the present invention is formed of a metal or plastic housing 11 having a body portion 13 which is generally rectangularly shaped and a front end portion 14 which is conically shaped. As shown in FIG. 5, the back wall 16 of the housing is formed with a recessed rectangular window frame 17 which extends to the sides of the housing. A transparent lucite plate 18 is seated and secured in the recess of the window frame. A back cover 20 made of a rectangular sheet of metal is connected to a hinge 21 which is attached to the bottom of the back wall 16 of the housing by a pair of thumb-screws 24. The back cover 20 is provided with a small slot 25 in the center of the upper end thereof which engages a catch 26 secured to the rear top of the housing by tightly hold the cover is its closed position. The lucite plate 18 and back cover 20 constitute a copyholder 28 which can accept a data processing card 23 or other card or paper stock bearing conventionally typewritten information or handwritten information. The length of the card 23 is such that a blank portion thereof may extend beyond the side of the copyholder 28.

Mounted on an opening 27 provided on the front conical portion of the housing is an afocal lens 29 which is positioned so that its field of view includes the area defined by the window frame 17 on the back wall 16 of the housing 11. The lens 29 functions as a supplementary lens in conjunction with the lens 63 of a movie camera 64 to define a set of close-up lenses which sharply image slating information on the card 23, positioned on the lucite plate 18, onto the film of the motion picture camera. It should be noted that this optical arrangement enables the camera to sharply focus into the film small size typewritten print on card 23 that is located a very short distance away, for example, 8 inches, from the lens 29.

The housing has a light tunnel 31 formed on the upper wall of the front conical end portion 14 thereof. An opening 30 is provided on the front end of the light tunnel 31. A mask insert 37 is inserted in a slot 39 on the upper wall of the light tunnel to close off the opening 30 for use with cameras not equipped with light-sensors. As will be subsequently described, an adaptor 32 may be snapped into the opening 30. The adaptor 32 provides for coupling the housing 11 to the photosensor holder 45 of the movie camera 64. A black, soft spongy, inner ring 52 is secured adjacent the opening 47 of the adaptor to provide a close fit about the end of the holder 32 for the purpose of excluding extraneous light.

Attached to the upper and lower inner walls, respectively, of the housing are an upper reflector 33a and a lower reflector 33b. These reflectors which may be formed of plastic or metal extend from one side of the housing to the other. The reflectors are curved and so disposed that light bulbs L1, L2, L3 and L4 held by sockets 34 located on each end of the reflectors direct their light rays onto the card 23 at the principal focus (the back surface of lucite plate 18) located on the back wall of the housing. The reflectors 33a and 33b thus serve to brightly and evenly illuminate the surface of the data processing card 23 placed behind the lucite plate 18. It should be clear that it is necessary to place the card 23 vbearing the information to be placed on the film at the lucite plate surface for critical focus, and within the light-tight housing 11 since such an approach assures that external light sources will not obscure or wipe out this information by specular reflection. To further optimize illumination, all the internal surfaces of the housing 11 are covered with a flat black paint.

The housing 11 is provided with a handle 35 on the upper surface of the body portion 13 thereof. Located on the wall of the housing below the handle 35 is a slide switch S1 and located on the wall of the housing in front of the handle is a push button switch S2. A flash light bulb L5 which functions as a synchronizing light is mounted in a socket 36 attached to the inner surface of the rear wall 16 above the lucite plate 18. An audio signal device 38 is mounted on the wall of the front conical portion 14 of the housing 11. Located on the bottom interior of the housing 11 in front of the lower reflector 33b is a compartment for a battery 41 and associated electronic parts.

A schematic diagram of the electrical circuit for interconnecting the battery 41 to the light bulbs L1-L5 and the audio signal device 38 is shown in FIG. 4. Thus, one side of the battery 41 is connected by slide switch S1 through a series resistor R1, through SPDT pushbutton switch S2, normally closed to allow capacitor C1 to charge, and then back to the other side of the battery. The other pole of the momentary push button switch S2 is connected to the audio signal device 38 and the synchronizing bulb L5 which are connected in parallel and returned to the other side of the battery 41. The slide switch S1 also connects the one side of the battery to the reflector light bulbs L1, L2, L3 and L4 which are connected in parallel and returned to the other side of the battery.

The bottom wall 42 of the housing is provided with a pair of slots 43 on either side thereof for receiving upwardly extending legs 44 located at each corner of a base 46. Screws 48 pass through holes on the sides of the housing and through elongated slots 50 on the upper portion of the legs 44. Nuts 51 are provided on the end of the screws. Thus when the base 46 is extended the desired distance below the bottom of the housing by moving the legs 44 relative to the screws 48, the base 46 is then secured in position by tightening the screws 48.

In addition to slating frames of a film, the device 10 of the present invention can be used to produce artistic titles on film containing the scene which is subsequently photographed after the identifying title. This is a distinct advantage because the need for separately photographing titles, processing them, and then cutting them into the film scenes by an editing function is thus eliminated. To accomplish this, the cover 20 on the back wall 16 of the slating device 10 may be interchanged with a rear illuminating end-box 56 which enables transparent copy to be placed in the copyholder 28 to further enhance the artistic effects obtainable. Thus the end-box 56 has a hinge 57 connected on the bottom thereof which similarly to the hinge 21 on the cover 20 is attached to the rear bottom wall of the housing by thumbscrews 58. A jack 59 is provided on one end of the side of the hinge 22 for mating with a plug (not shown) on the rear wall of the housing. The plug is connected in circuit with the slide switch S1 to the battery 41. The end-box 56 has one of the light bulbs L6-L9 positioned in each of the corners thereof, two of which L6 and L8 are illustrated in FIG. 6, which reflect light on the rear of a translucent lucite plate 60 covering the front of the end-box 56. The lucite plate 60 provides for diffusing the light provided by the bulbs L6-L9. A slot 61 is provided on the upper wall of the end-box 56 for a color filter 62 which when inserted into the end-box 56 provides for changing the color of the background of the transparent copy 65 held between the lucite plate 18 on the back wall of the housing and the lucite plate 60 in the front of the end-box 65.

When in use the slating device 10 is positioned with its lens 29 adjacent the lens 63 of the lens holder 54 on the movie camera 64. If the movie camera 64 is provided with a photosensor response, the end of the photosensor holder 45 is fitted into the adaptor 32 on the upper front end of the housing. The mask insert 37 is then lifted out of its slot 39 on the top of the housing. It should be noted that if the movie camera 64 is of the type that responds to light in the housing by way of its lens 63, i.e., through-the-lens, then the mask insert 37 is left in place and no adaptor is needed.

To operate the slating device the data processing card 23 with the appropriate data printed thereon by a typewriter, for example, or handwritten, is inserted against the lucite plate 18 secured on the back wall 16 of the housing. The cover 20 is then closed and held in position by catch 26. The slating device 10 is then held in position with its lens 29 adjacent the lens 63 in the lens holder 54 of the movie camera 64 by use of the handle 35. Or, if the movie camera 64 is set on a table, or other flat surface, the base 46 of the slating device 10 can be adjusted so that the slating device is at the proper level to align the axis of the lens 29 with the lens axis of the movie camera 64.

The slide switch S1 is then closed. This causes capacitor C1 to be charged through resistor R1, and simultaneously turns on the reflector light bulbs L1-L4 to illuminate the card 23 in the cardholder 28. When the movie camera 64 reaches the proper film speed, the push button switch S2 is momentarily depressed causing capacitor C1 to discharge to energize the audio signal device 38 and the synchronizing bulb L5. The discharge pulse of capacitor C1 produces a high intensity burst of light from the bulb L5 of a fraction of a second duration which is sufficient to clearly identify the synchronizing frame of the film from adjacent frames thereof, after the film is developed. The "beep" sound momentarily produced by the audio signal device 38 is picked up by a microphone or otherwise fed into the sound recorder and provides a matching synchronizing point to match the audio beep on the sound track with the synchronizing frame.

It should be especially noted that the lens 29 on the slating device operates as a supplementary lens in conjunction with the lens 63 of the movie camera to shorten the focal length of the movie camera lens 63. The advantage of such an optical arrangement is that a data processing card 23 or other record medium having information on the back thereof, of a size as obtained by a standard typewriter, when held in position against the lucite plate 18 at a precise short distance away, for example, 8 inches, will be sharply focused onto the film of the movie camera. Such an arrangement is highly desirable since it enables data processing cards 23 of the type that are conventionally used with automated equipment to be used for providing slating information for identifying scenes and takes during motion picture production. Moveover, since the information on the card 23 is of the size as presented by a conventional typewriter, a lot more information can be placed before the movie camera during slating. In fact, by proper choice of slating lens 29 this information can fill the frame of the film and yet be of the proper size so that it can be magnified to the correct size for easy reading during the editing of the film. This is a distinct advantage over conventional slate board identification which typically occupies a relatively small area of the frame and makes reading of the information difficult at standard magnifications used in film editing devices. In addition, because of better utilization of the frame, considerably more pertinent information can be recorded on the frame.

After the reel of film has been exposed and has been processed, a representative frame from each scene or take can be placed in an aperture provided on one end portion of a card, similar to card 23, which is provided for each scene or take. Such an arrangement is highly useful in that a large number of these cards can be scanned by automatic equipment for retrieval purposes. Thus, in news coverage, for example, selected or sequential film reels can be identified and made available in seconds for examination and selection. It should be noted that the front face 55 of the end portion of the card 23, as shown in FIG. 9, may be arranged with columns of indicia which an be punched to provide coded information that does not change. Additionally, information can be added by the cameraman which is later punched on the card. Such an approach further enables data processing cards 23 of the type as shown in FIGS. 8 and 9 to be used in data processing equipment for controlling cost, inventory and retrieval of the film reels. Thus the slating device serves to link actual scene information with record keeping and cost accounting functions of motion picture presentation or production. In particular, the card 23 serves as an integral part of a system that enables charges, scenes and all record keeping functions to be associated with a particular motion picture production for accounting and retrieval purposes.

While in order to comply with the statute the invention has been described in language more or less specific as to structural features, it is to be understood that the invention is not limited to the specific features shown but that the means and construction herein disclosed comprise a preferred form of putting the invention into effect and the invention is therefore claimed in any of its forms or modifications within the legitimate and valid scope of the appended claims.

What is claimed is:

1. A portable slating device for use with a movie camera having a lens, a film, and a separate sound recorder, said device comprising:
    a light-tight housing having a lens on the front end and a copyholder on the back end thereof for holding an opaque record medium having information on the face thereof of a size as provided by a conventional typewriter,
    a source of electrical energy,
    light bulbs in said housing connected to said source of electrical energy and positioned for illuminating the face of the record medium so that the information thereon can be photographed,
    a synchronizing light bulb located in said housing,
    an audio signal means mounted on the wall of said housing, and
    circuit means connected to said source of electrical energy and including a switch attached to the wall of said housing which when closed provides for momentarily simultaneously energizing said synchronizing light bulb and said audio signal means,
    whereby when the front end of said housing is positioned adjacent the lens of the camera operating at sound speed for the housing lens functions as a supplementary close-up lens which cooperates with the camera lens to sharply focus the information on the opaque record medium onto the film, and
    whereby when said switch is closed said synchronizing light bulb flashes on a frame of the film and said audio signal means emits an audio signal which is recorded by the sound recorder for use in thereafter synchronizing the visual action on the film with the audio on the sound recorder.

2. The invention is accordance with claim 1 wherein said copyholder includes a transparent plate on the back of said housing and a hinged cover for holding said opaque record medium against said transparent plate.

3. The invention is accordance with claim 1 including reflectors inside said housing for directing light from said light bulbs onto the said opaque record medium.

4. The invention in accordance with claim 1 wherein said camera includes a photosensor, and including a light tunnel on the front of said housing for directing light from within said housing onto said photosensor.

5. The invention in accordance with claim 1 wherein said circuit means includes a capacitor which is discharged to energize said synchronizing light bulb and said audio signal means when said switch is closed.

6. The invention in accordance with claim 2 wherein said record medium is a data processing card having information thereon of a size as provided by a conventional typewriter.

7. The invention is accordance with claim 1 wherein said source of electrical energy is a battery.

8. The invention in accordance with claim 1 including an adjustable support on said housing for changing the elevation thereof to align the housing lens with the lens of the camera.

* * * * *